United States Patent
Zhang et al.

(10) Patent No.: US 9,845,913 B2
(45) Date of Patent: Dec. 19, 2017

(54) SYSTEM AND METHOD FOR SUPPORTING A COMPACT SERVO SYSTEM

(71) Applicant: SZ DJI TECHNOLOGY CO., LTD., Shenzhen (CN)

(72) Inventors: Dongjun Zhang, Shenzhen (CN); Xueli Yan, Shenzhen (CN); Ye Tao, Shenzhen (CN)

(73) Assignee: SZ DJI OSMO TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 15/349,623

(22) Filed: Nov. 11, 2016

(65) Prior Publication Data

US 2017/0059083 A1   Mar. 2, 2017

Related U.S. Application Data

(63) Continuation of application No. PCT/CN2015/086990, filed on Aug. 14, 2015.

(51) Int. Cl.
*F16M 11/18* (2006.01)
*B64C 39/02* (2006.01)
(Continued)

(52) U.S. Cl.
CPC ........... *F16M 11/18* (2013.01); *B64C 39/024* (2013.01); *F16M 13/022* (2013.01); *H02K 7/14* (2013.01); *B64C 2201/127* (2013.01)

(58) Field of Classification Search
CPC ........ F16M 11/18; F16M 13/022; H02K 1/12; H02K 1/2706; H02K 11/33; H02K 5/16; H02K 3/28; B64C 39/024
See application file for complete search history.

(56) References Cited

U.S. PATENT DOCUMENTS 5,473,210 A * 12/1995 Someya .................. H02K 1/17
                                                       29/607
6,331,741 B1 * 12/2001 Suzuki .................. H02K 37/16
                                                       310/156.01
(Continued)

FOREIGN PATENT DOCUMENTS

CN        2735643        10/2005
CN        101191883       6/2008
(Continued)

OTHER PUBLICATIONS

International Search Report form the State Intellectual Property Office of the P.R. China Patent Office in corresponding International Application No. PCT/CN2015/086990 dated May 10, 2016.
(Continued)

*Primary Examiner* — Naishadh Desai
(74) *Attorney, Agent, or Firm* — Finnegan, Henderson, Farabow, Garrett & Dunner, L.L.P.

(57) ABSTRACT

System and method can support a servo system. The servo system comprises a motor with a rotor and a stator, wherein said rotor is arranged internally to said stator. Furthermore, said rotor, which is rotatable relative to said stator, can be configured to receive at least a portion of a functional module. Additionally, the servo system can be used for supporting a payload stabilization system, such as a gimbal system.

30 Claims, 7 Drawing Sheets

(51) Int. Cl.
*F16M 13/02* (2006.01)
*H02K 7/14* (2006.01)

(56) References Cited

U.S. PATENT DOCUMENTS

| | | | | |
|---|---|---|---|---|
| 2005/0040718 A1* | 2/2005 | Sesselmann | ........... | H02K 5/225 310/89 |
| 2007/0138901 A1* | 6/2007 | Bin | ........... | H02K 1/145 310/257 |
| 2008/0197728 A1* | 8/2008 | Loussert | ........... | H02K 11/01 310/71 |
| 2008/0240706 A1* | 10/2008 | Akiba | ........... | G03B 17/00 396/428 |
| 2011/0007408 A1 | 1/2011 | Kurosawa et al. | | |
| 2013/0002051 A1 | 1/2013 | Hsu et al. | | |
| 2013/0324190 A1* | 12/2013 | Ju | ........... | G06F 3/0317 455/556.1 |

FOREIGN PATENT DOCUMENTS

| | | |
|---|---|---|
| CN | 202255408 | 5/2012 |
| CN | 202392373 | 8/2012 |
| CN | 103777305 | 5/2014 |
| CN | 103825408 | 5/2014 |
| CN | 203705964 | 7/2014 |
| CN | 104158378 | 11/2014 |
| JP | 8-159773 | 6/1996 |
| JP | 9-154057 | 6/1997 |
| JP | 2008-129597 | 6/2008 |
| JP | 2010-172076 | 8/2010 |
| TW | I427903 | 2/2014 |
| WO | WO 2013/033924 | 3/2013 |

OTHER PUBLICATIONS

Written Opinion of the International Searching Authority from the State Intellectual Property Office of the P.R. China Patent Office in corresponding International Application No. PCT/CN2015/086990, dated May 10, 2016.

Notification of Reasons for Refusal from the Japanese Patent Office, in counterpart Japanese Application No. 2016-549565 dated Aug. 15, 2017.

* cited by examiner

SYSTEM AND METHOD FOR SUPPORTING A COMPACT SERVO SYSTEM

CROSS-REFERENCE TO RELATED APPLICATIONS

This application is a continuation application of International Application No. PCT/CN2015/086990 filed on Aug. 14, 2015, the content of which is hereby incorporated by reference in its entirety.

BACKGROUND OF THE INVENTION

The disclosed embodiments relate generally to mechanical devices and more particularly, but not exclusively, to supporting a servo system.

The unmanned aircraft and other modern technological wonders can take advantage of various types of servo systems. In the meantime, the development of such technologies imposes new requirements on the designing of the servo systems. For example, the engineers can greatly improve the functionality of an aerial photographical system by reducing the size and weight of the servo system that are used for stabilizing the aerial photographical system, which may be carried by an unmanned aircraft.

This is the general area that embodiments of the invention are intended to address.

BRIEF SUMMARY OF THE INVENTION

Described herein are systems and methods that can support a servo system. The servo system comprises a motor with a rotor and a stator, wherein said rotor is arranged internally to said stator. Furthermore, said rotor, which is rotatable relative to said stator, can be configured to receive at least a portion of a functional module. Additionally, the servo system can be used for supporting a payload stabilization system, such as a gimbal system.

Other objects and features of the present invention will become apparent by a review of the specification, claims, and appended figures.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings briefly described herein.

DETAILED DESCRIPTION OF THE INVENTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses a gimbal system as example for a payload stabilization system. It will be apparent to those skilled in the art that other types of stabilization systems can be used without limitation.

In accordance with various embodiments of the present invention, a servo system can be based on an inner rotor motor, such as a brushless direct current (BLDC) motor.

Figure 1:
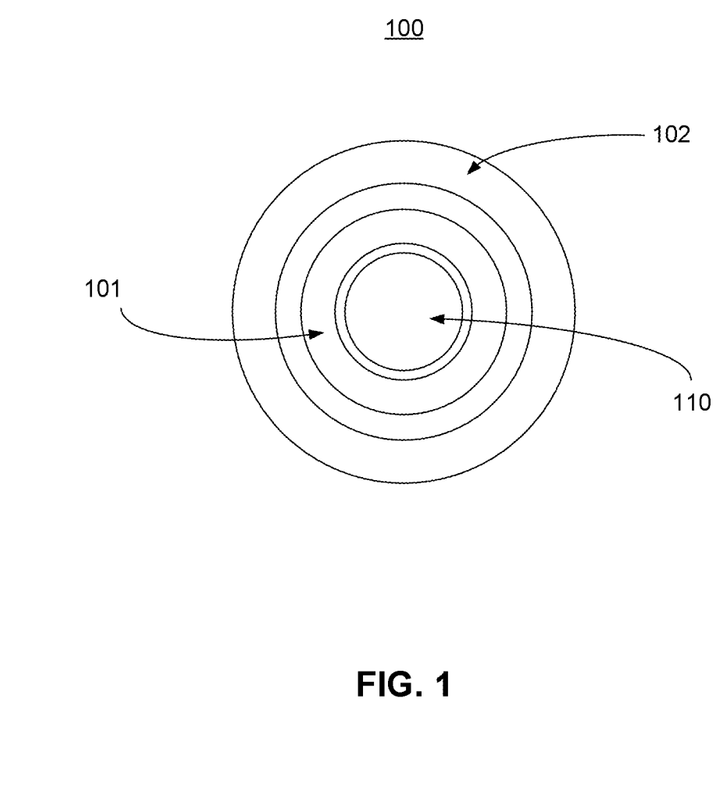
FIG. 1 is an exemplary illustration of a compact servo system, in accordance with various embodiments of the present invention.

FIG. 1 is an exemplary illustration of a compact servo system, in accordance with various embodiments of the present invention. As shown in FIG. 1, a compact servo system 100 can be based on an inner rotor motor that includes a rotor 101 and a stator 102. The rotor 101, which is arranged internally to the stator 102, is rotatable relative to the stator 102. Furthermore, a functional module 110 can be at least partially received by the rotor 101 (For example, the functional module 110 can be fully embedded in the rotor 101).

In accordance with various embodiments of the present invention, the functional module 110 can be configured for performing different functionalities. For example, the functional module 110 can include an imaging module (such as a camera module), which includes a lens and/or an image sensor. Additionally, an imaging control module can be electronically coupled with the imaging module. Also, the imaging module may use a signal line to transmit the recorded image signals to an image signal processor.

Alternatively, the functional module 110 can include a frame assembly that may be able to support various devices, which are configured for performing different functions. For example, the frame assembly can be part of a gimbal system that can stabilize a payload.

In accordance with various embodiments of the present invention, wire or coil windings can be arranged on the inner surface (or periphery) of the stator 102, while permanent magnets can be arranged on the outside surface (or periphery) of the rotor 101 (Alternatively, permanent magnets can be embedded or inserted within the rotor 101).

Thus, the stator 102 in the compact servo system 100 can cause the rotor 101 (along with the functional module 110) to perform a rotating movement about the center axis of the motor, such as the center axis for the stator 102 or the rotor 101. On the other hand, the compact servo system 100 can prevent the rotor 101 (along with the functional module 110) from moving in a direction along the center axis of the motor.

For example, the compact servo system 100 can be based on a BLDC motor. The rotor 101 for the BLDC motor can take advantage of permanent magnets in multiple pole pairs, while the stator 102 for the BLDC motor can utilize windings that are connected in a star fashion. Alternatively, the windings on the stator 102 can be connected in a triangular fashion or other similar fashions. Such a compact servo system 100, can be used for stabilizing a payload, since it is easy to control and easy to balance due to the light weight and simple structure.

Additionally, various feedback devices, such as magnetic hall sensors and optical commutation encoders, can be attached to the motor shaft for indicating the current rotor position to the controller for the BLDC motor. Thus, the controller or control module for the BLDC motor, which is electronically commutated, can determine the correct position of the rotor 101 relative to the stator 102 for supporting the commutation process.

Then, the BLDC motor can direct current flow through the various stator windings to produce an output torque.

In accordance with various embodiments of the present invention, the inner rotor motor can be based on various other configurations. For example, the permanent magnets can be arranged on the inner surface of the stator 101, while the windings can be arranged on the outside surface of the rotor 102. The inner rotor motor can direct current flow through the windings the rotor 102, which interact with the magnetic field produced by the permanent magnets on the rotor 102 to produce an output torque.

Alternatively, different windings can be arranged on both the the stator 101 and the rotor 102. The magnetic fields produced by the windings on the stator 101 and the rotor 102 can interact with each other to produce an output torque, when the inner rotor motor can direct current flow through the windings.

Figure 2:
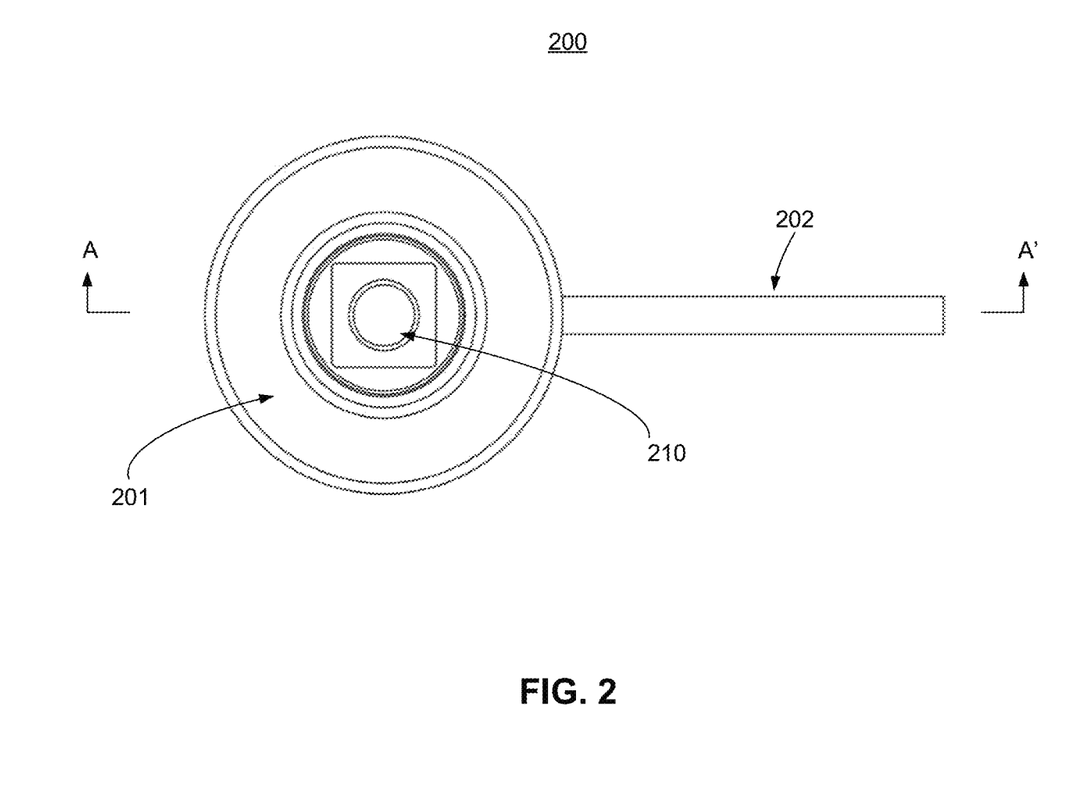
FIG. 2 is an exemplary illustration of embedding an imaging module in an inner rotor motor, in accordance with various embodiments of the present invention.

FIG. 2 is an exemplary illustration of embedding an imaging module in an inner rotor motor, in accordance with various embodiments of the present invention. As shown in FIG. 2, a servo assembly 200 can support an imaging module 210, which includes a lens 203. Furthermore, the imaging module 210 is embedded within an inner rotor motor 201, which can receive control signals via a control signal line 202.

Figure 3:
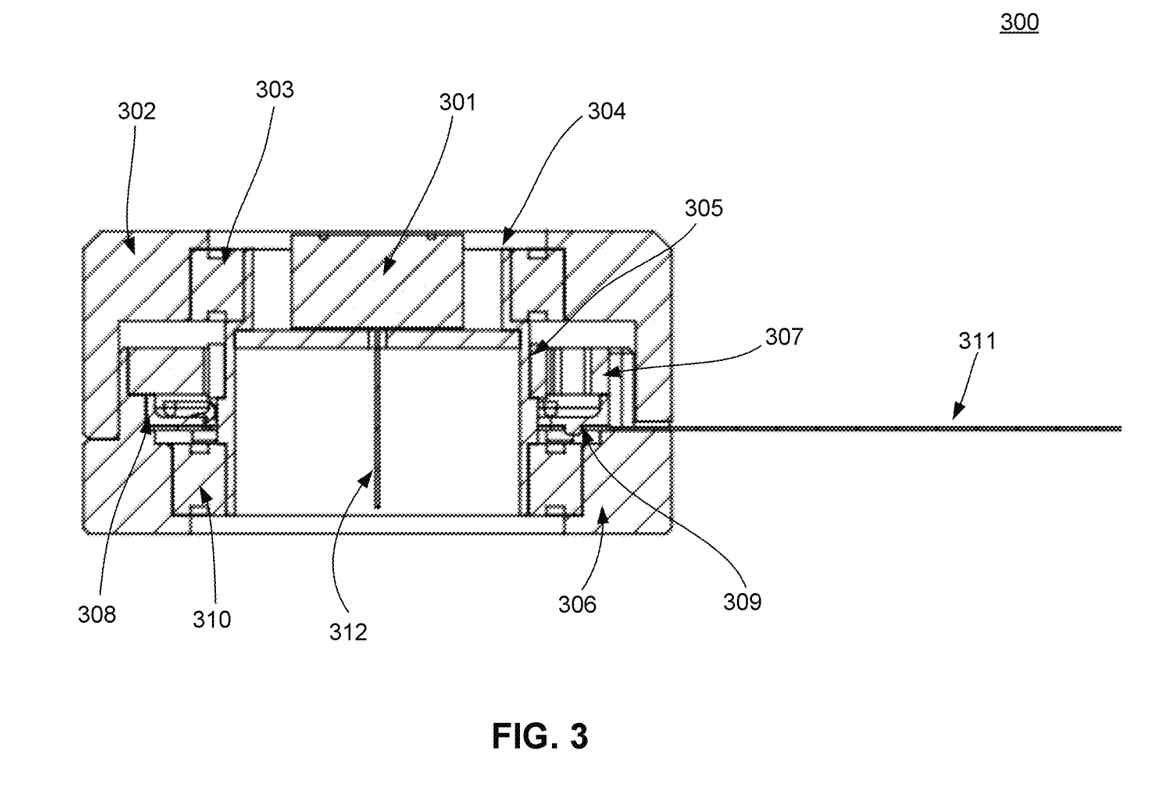
FIG. 3 is an exemplary illustration of a cross-sectional view of an inner rotor motor with an embedded imaging module, taken along a line A-A' in FIG. 2, in accordance with various embodiments of the present invention.
Figure 4:
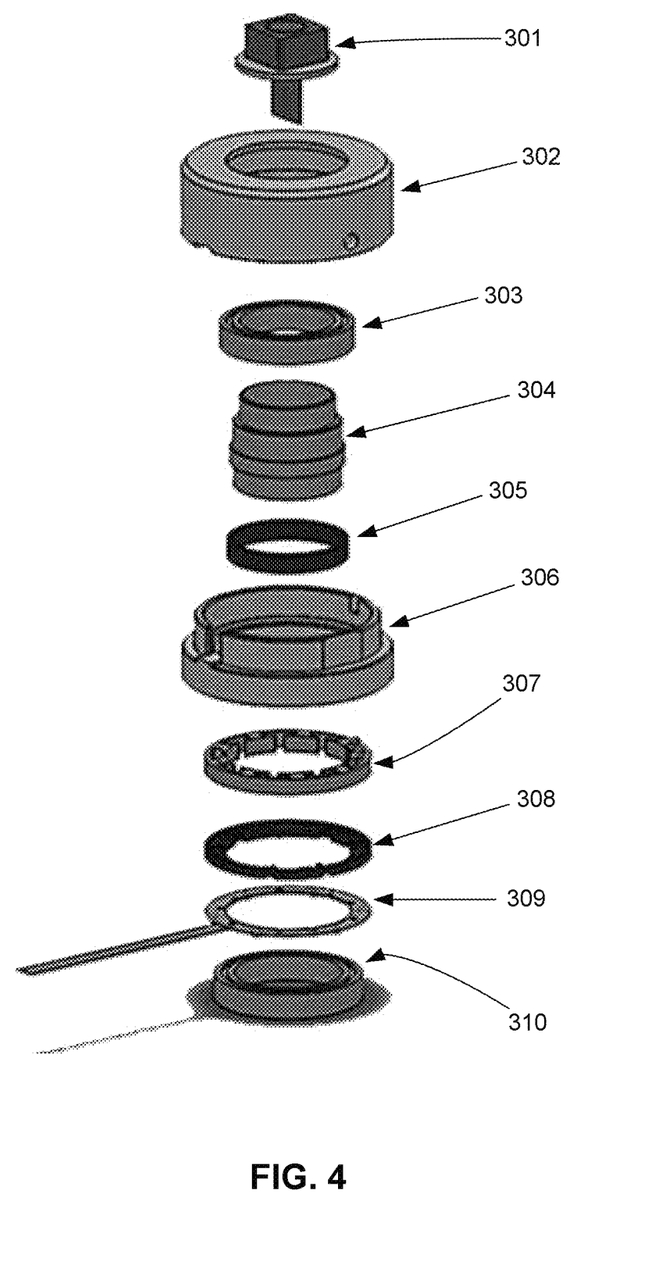
FIG. 4 is an exemplary illustration of explosive chart for an inner rotor motor with an embedded imaging module, in accordance with various embodiments of the present invention.

FIG. 3 is an exemplary illustration of a cross-sectional view of an inner rotor motor with an embedded imaging module, taken along a line A-A' in FIG. 2, in accordance with various embodiments of the present invention. FIG. 4 is an exemplary illustration of explosive chart for an inner rotor motor with an embedded imaging module, in accordance with various embodiments of the present invention.

In accordance with various embodiments of the present invention, an inner rotor motor (e.g. a BLDC motor) can include a rotor and a stator, both of which can be contained in a chamber, formed by an upper cover 302 and a lower cover 306 when closed together.

The rotor of the inner rotor motor may include a magnet yoke 304. As shown in FIG. 3, permanent magnets 305 can be arranged on the outside surface of the magnet yoke 304 (e.g. in multiple pole pairs). Additionally, an imaging module 301 can be mounted within a magnet yoke 304. Also, the imaging module 301 can use a signal line 312 for transmitting recorded image signals to an image signal processor.

Furthermore, the stator of the inner rotor motor may include a core 307 placed on top of a gasket 308 for holding windings. As shown in FIG. 4, the core 307, which is a ring structure, can be constructed from stacked steel laminations with windings placed in the slots that are cut axially along the inner periphery or surface of the ring structure. Each of these windings are interconnected coils that are distributed over the inner periphery or surface of the stator to form an even number of poles.

Additionally, a control module 309 can receive various control signals, e.g. from an electronic controller, for controlling the operation of the servo system. The control module 309 can control the electric current to be applied on the windings arranged on the stator. When the electric current is applied on the windings, the magnetic fields produced by the windings can interact with the magnetic fields produced by the permanent magnets 305 to produce an output torque.

Moreover, the inner rotor motor can use one or more bearings 303 and 310 for supporting the rotating movement by the rotor relative to the stator. Alternatively, the inner rotor motor can use one or more sliding rings for supporting the rotating movement by the rotor relative to the stator. Additionally, the bearings 303 and 310 (or the sliding rings) can be configured to be fixed along the center axis, for preventing a functional module, such as the imaging module 301, from moving in the direction along the center axis.

Figure 5:
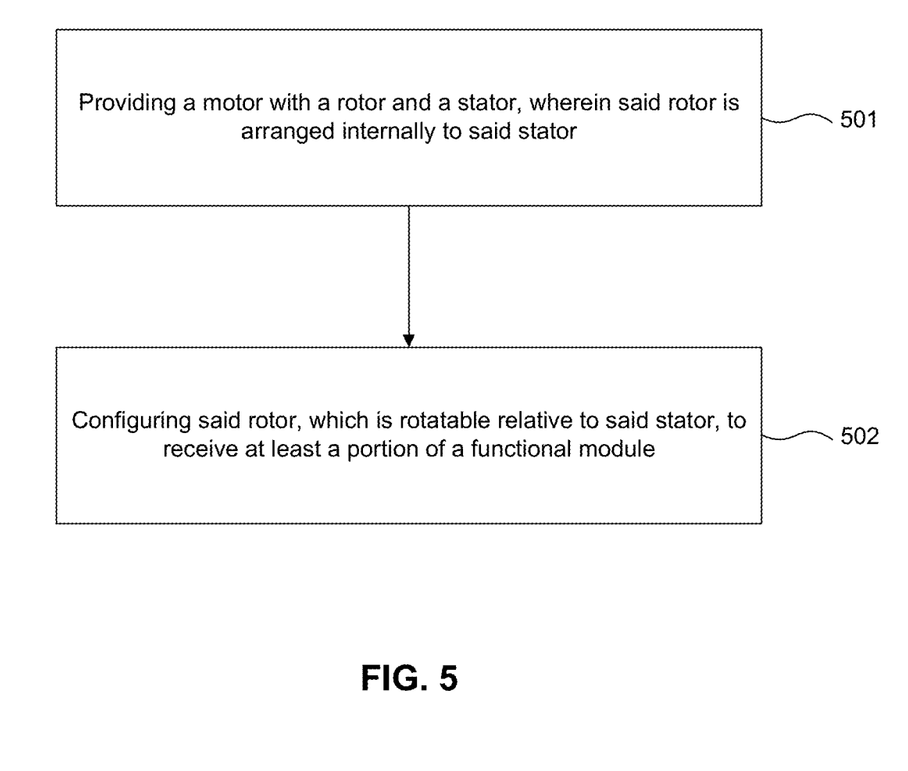
FIG. 5 shows a flowchart of supporting a compact servo system, in accordance with various embodiments of the present invention.

FIG. 5 shows a flowchart of supporting a compact servo system, in accordance with various embodiments of the present invention. As shown in FIG. 5, at step 501, the system provides a motor with a rotor and a stator, wherein said rotor is arranged internally to said stator. Then, at step 502, the system can configure said rotor, which is rotatable relative to said stator, to receive at least a portion of a functional module.

Figure 6:
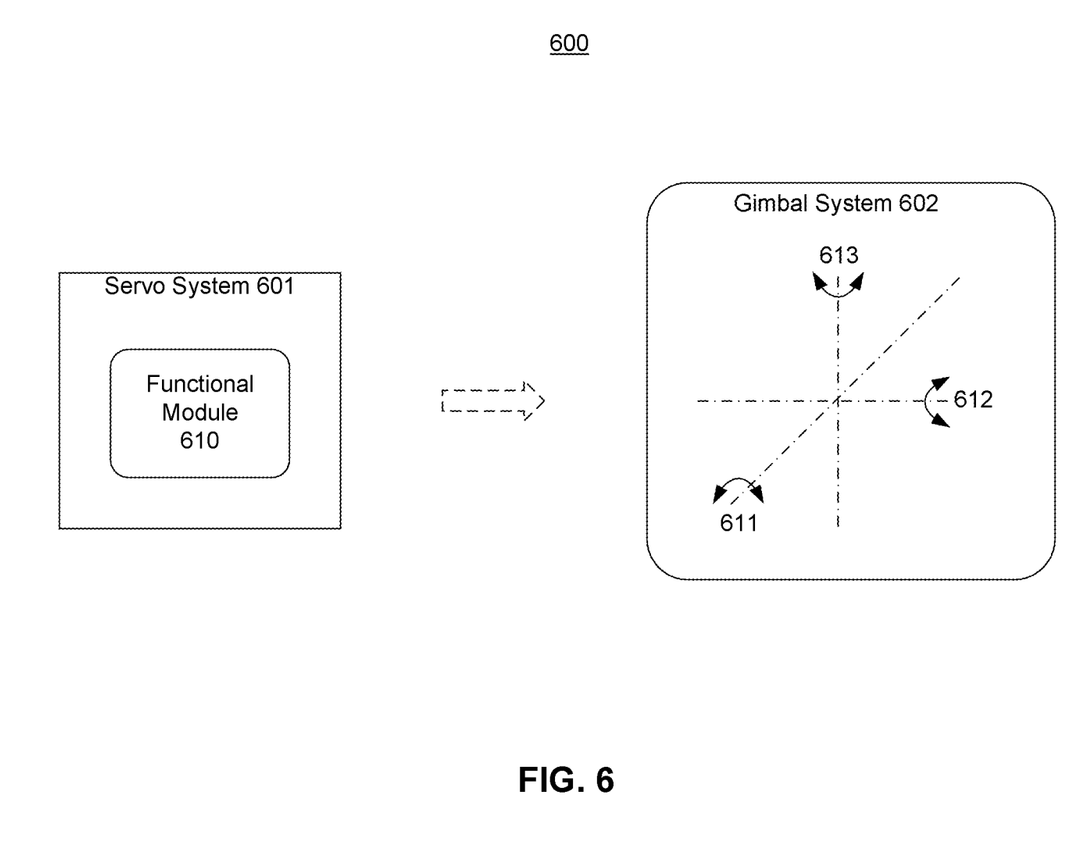
FIG. 6 is an exemplary illustration of supporting a payload stabilization system based on a servo system, in accordance with various embodiments of the present invention.

FIG. 6 is an exemplary illustration of supporting a payload stabilization system based on a servo system, in accordance with various embodiments of the present invention. As shown in FIG. 6, a payload stabilization system, such as a gimbal system 602, can stabilize a payload. The gimbal system 602 can be based on a servo system 601, and the payload can be a functional module 610 such as an image capturing device.

In accordance with various embodiments of the present invention, a carrier 600 based on the gimbal system 602 can be used for coupling a payload, such as an image capturing device, to a movable object such as an unmanned aerial vehicle (UAV).

The gimbal system 602 can be configured to permit the payload to rotate about or around up to three axes, such as a pitch axis 612, a yaw axis 613, and/or a roll axis 611, relative to the movable object. For instance, the gimbal system 602 may be configured to permit the payload to rotate only around one, two, or all three of the axes. The three axes may or may not be orthogonal to each other. The range of rotation around any of the axes may or may not be limited and may vary for each of the axes. The axes of rotation may or may not intersect with one another. For example, three orthogonal axes may intersect with one another. They may or may not intersect at a payload. Alternatively, they may not intersect.

The gimbal system 602 can include a frame assembly comprising several frame members. One frame member can be configured to be coupled with and support the payload (e.g., the image capturing device).

In some embodiments, the carrier 600 can utilize one or more carrier sensors useful for determining a state of the gimbal system 602 or the payload carried. The state information may include a spatial disposition (e.g., position, orientation, or attitude), a velocity (e.g., linear or angular velocity), an acceleration (e.g., linear or angular acceleration), and/or other information about the carrier, a component thereof, and/or the payload. In some embodiments, the state information as acquired or calculated from the sensor data may be used as feedback data to control the rotation of the components (e.g., frame members) of the carrier. Examples of such carrier sensors may include motion sensors (e.g., accelerometers), rotation sensors (e.g., gyroscope), inertial sensors, and the like.

The carrier sensors may be coupled to any suitable portion or portions of the carrier 600 (e.g., frame members and/or actuator members) and may or may not be movable relative to the movable object. Additionally or alternatively, at least some of the carrier sensors may be coupled directly to the payload carried by the carrier.

The carrier sensors may be coupled with some or all of the actuator members of the gimbal system 602. For example, three carrier sensors can be respectively coupled to the actuator members (e.g. motors) and can be configured to measure the driving of the respective actuator members. Such sensors can include potentiometers or other similar sensors. In an embodiment, a sensor (e.g., potentiometer) can be inserted on a motor shaft of a motor so as to measure the relative position of a motor rotor and motor stator, thereby measuring the relative position of the rotor and stator and generating a position signal representative thereof. In an embodiment, each actuator-coupled sensor is configured to provide a positional signal for the corresponding actuator member that it measures. For example, a first potentiometer can be used to generate a first position signal for the first actuator member, a second potentiometer can be used to generate a second position signal for the second actuator member, and a third potentiometer can be used to generate a third position signal for the third actuator member. In some embodiments, carrier sensors may also be coupled to some or all of the frame members of the carrier. The sensors may be able to convey information about the position and/or orientation of one, two, three, four or more frame members of the carrier and/or the image capturing device. The sensor data may be used to determine position and/or orientation of the image capturing device relative to the movable object and/or a reference frame.

The carrier sensors can provide position and/or orientation data that may be transmitted to one or more controllers (not shown) on the carrier or movable object. The sensor data can be used in a feedback-based control scheme. The control scheme can be used to control the driving of a plurality of actuator members. One or more controllers, which may be situated on a carrier or on a movable object carrying the carrier, can generate control signals for driving the actuator members. In some instances, the control signals can be generated based on data received from carrier sensors indicative of the spatial disposition of the carrier or the payload carried by the carrier 600. The carrier sensors may be situated on the carrier or the payload. The control signals produced by the controllers can be received by the different actuator drivers. Based on the control signals, the actuator drivers may control the driving of the different actuator members, for example, to effect a rotation of one or more components of the carrier. An actuator driver can include hardware and/or software components suitable for controlling the driving of a corresponding actuator member and receiving position signals from a corresponding sensor (e.g., potentiometer). The control signals can be transmitted simultaneously to the actuator drivers to produce simultaneous driving of the actuator members. Alternatively, the control signals can be transmitted sequentially, or to only one of the actuator drivers. Advantageously, the control scheme can be used to provide feedback control for driving actuator members of a carrier, thereby enabling more precise and accurate rotation of the carrier components.

In some instances, the carrier 600 can be coupled indirectly to the UAV via one or more damping elements. The damping elements can be configured to reduce or eliminate movement of the load (e.g., payload, carrier, or both) caused by the movement of the movable object (e.g., UAV). The damping elements can include any element suitable for damping motion of the coupled load, such as an active damping element, a passive damping element, or a hybrid damping element having both active and passive damping characteristics. The motion damped by the damping elements provided herein can include one or more of vibrations, oscillations, shaking, or impacts. For example, the motion may include vibrations caused by the operation of a propulsion system and/or other components of a UAV.

The damping elements may provide motion damping by isolating the load from the source of unwanted motion by dissipating or reducing the amount of motion transmitted to the load (e.g., vibration isolation). The damping elements may reduce the magnitude (e.g., amplitude) of the motion that would otherwise be experienced by the load. The motion damping applied by the damping elements may be used to stabilize the load, thereby improving the quality of images captured by the load (e.g., image capturing device), as well as reducing the computational complexity of image stitching steps required to generate a panoramic image based on the captured images.

The damping elements described herein can be formed from any suitable material or combination of materials, including solid, liquid, or gaseous materials. The materials used for the damping elements may be compressible and/or deformable. For example, the damping elements can be made of sponge, foam, rubber, gel, and the like. Also, damping elements can include rubber balls that are substantially spherical in shape. The damping elements can be of any suitable shape such as substantially spherical, rectangular, cylindrical, and the like. Alternatively or in addition, the damping elements can include piezoelectric materials or shape memory materials. The damping elements can include one or more mechanical elements, such as springs, pistons, hydraulics, pneumatics, dashpots, shock absorbers, isolators, and the like. The properties of the damping elements can be selected so as to provide a predetermined amount of motion damping. In some instances, the damping elements may have viscoelastic properties. The properties of the damping elements may be isotropic or anisotropic. For instance, the damping elements may provide motion damping equally along all directions of motion. Also, the damping element may provide motion damping only along a subset of the directions of motion (e.g., along a single direction of motion). For example, the damping elements may provide damping primarily along the yaw axis. As such, the illustrated damping elements can be configured to reduce vertical motions.

Although embodiments herein may be depicted as utilizing a single type of damping elements (e.g., rubber balls), it shall be understood that any suitable combination of types of damping elements can be used. For example, the carrier may be coupled to the movable object using one or more damping elements of any suitable type or types. The damping elements may have the same or different characteristics or properties such as stiffness, viscoelasticity, and the like. Each damping element can be coupled to a different portion of the load or only to a certain portion of the load. For instance, the damping elements may be located near contact or coupling points or surfaces of between the load and the movable objects. In some instances, the load can be embedded within or enclosed by one or more damping elements.

Figure 7:
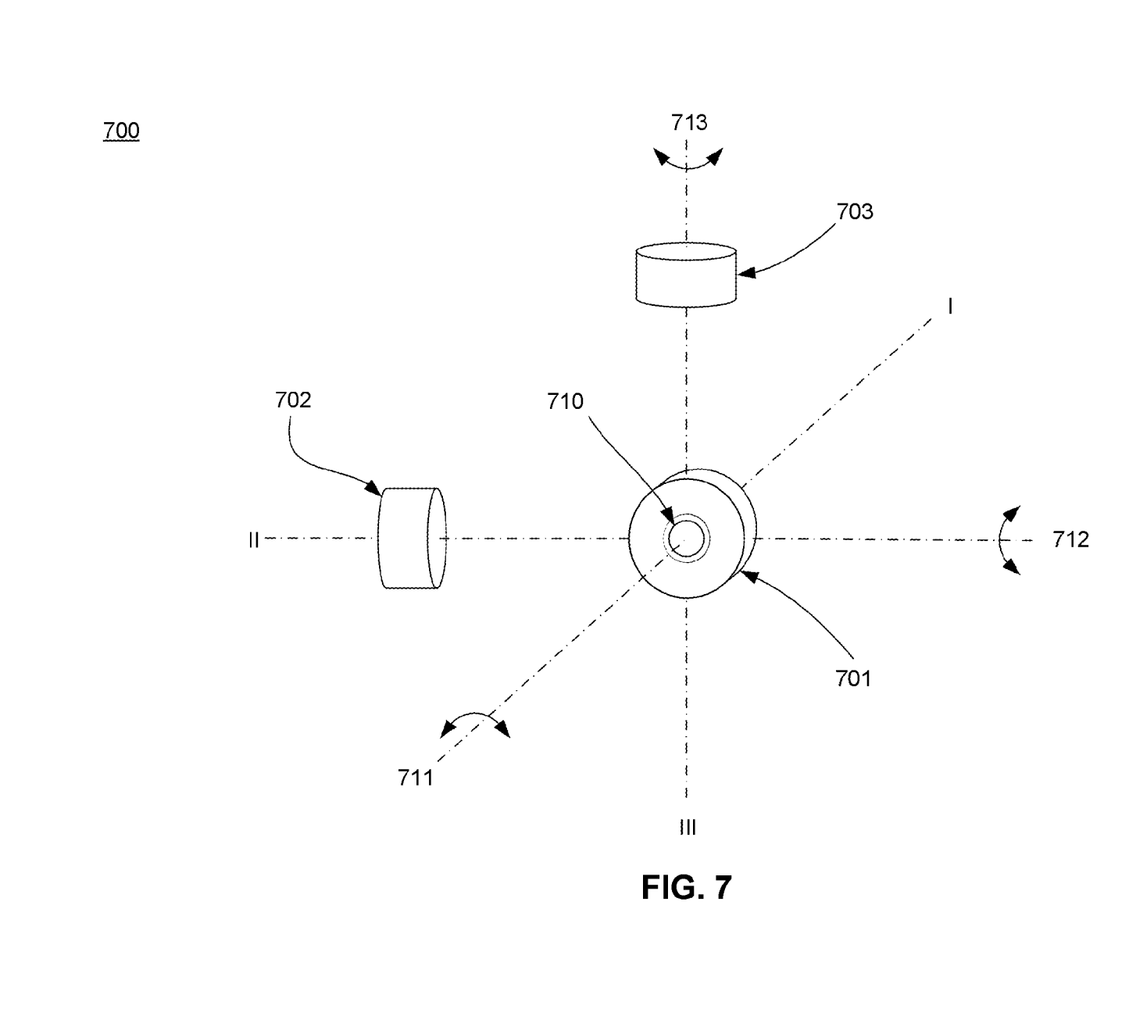
FIG. 7 is an exemplary illustration of a gimbal system with a camera module embedded in an inner rotor motor, in accordance with various embodiments of the present invention.

FIG. 7 is an exemplary illustration of a gimbal system with a camera module embedded in an inner rotor motor, in accordance with various embodiments of the present invention. As shown in FIG. 7, a gimbal system 700 can stabilize a camera module 710, which is embedded within an inner rotor motor 701, relative to a pitch axis 712, a yaw axis 713, and/or a roll axis 711.

Furthermore, the inner rotor motor 701, along with the camera module 710, can be actuated to rotate about an axis, I, which matches the roll 701 axis of the gimbal system 700. Also, the inner rotor motor 701 and the camera module 710 can be configured to have a center of gravity that is substantially close to a balance point in the gimbal system 700 (such as an intersection point for the pitch 712 axis, a yaw 713 axis, and/or a roll 711 axis).

In accordance with various embodiments of the present invention, the gimbal system 700 can take advantage of multiple motors 701-703 that are distributed in the space. For example, the motor 701 can control the rotation of the camera module 710 about the roll axis 711 (i.e. the axis I), while the motor 702 controls the rotation of the camera module 710 about the pitch axis 712 (i.e. the axis II), and the motor 701 controls the rotation of the camera module 710 about the yaw axis 713 (i.e. the axis III).

Additionally, the motors 701-703 can be connected with each other via frame assemblies. For example, the rotor for the motor 702 can connect with the stator of the inner rotor motor 701, and the rotor for the motor 703 can connect with the stator of the inner rotor motor 702. Alternatively, the rotor for the motor 703 can connect with the stator of the inner rotor motor 701, and the rotor for the motor 702 can connect with the stator of the inner rotor motor 703.

Thus, the gimbal system 700, which has a simple structure and is light in weight, can be easily controlled and balanced.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A gimbal system, comprising:
a servo assembly, which includes an internal rotor motor embedded with a functional module, wherein the internal rotor motor operates to actuate a roll movement of the functional module; and
another motor that is adapted to actuate a rotation movement of the functional module relative to a pitch axis or a yaw axis, and
wherein the servo assembly is configured to have a center of gravity that is substantially close to an intersection point of the pitch axis and the yaw axis.

2. A method for providing a gimbal system, comprising:
providing a servo assembly, which includes an internal rotor motor embedded with a functional module, wherein the internal rotor motor operates to actuate a roll movement of the functional module; and
providing another motor that is adapted to actuate a rotation movement of the functional module relative to a pitch axis or a yaw axis in the gimbal system, and
configuring the servo assembly to have a center of gravity that is substantially close to an intersection point of the pitch axis and the yaw axis.

3. The gimbal system of claim 1, wherein:
the internal rotor motor comprises a rotor and a stator, said rotor being arranged internally to said stator, and said rotor, which is rotatable relative to said stator, is configured to receive at least a portion of the functional module.

4. The gimbal system of claim 3, wherein said rotor includes a magnet yoke, wherein the functional module is mounted within the magnet yoke of said rotor.

5. The gimbal system of claim 4, wherein:
one or more magnets are arranged on an outside surface of the magnet yoke of said rotor; and
one or more windings are arranged on said stator.

6. The gimbal system of claim 5, further comprising:
a control module that controls electric current to be applied on said one or more windings, wherein said one or more windings operate to generate a magnetic field that interacts with a magnetic field generated by the one or more magnets to produce an output torque, when the electric current is applied on said one or more windings.

7. The gimbal system of claim 3, wherein:
one or more magnets are arranged on an inner surface of said stator;
one or more windings are arranged on an outside surface of said rotor; and
a control module that controls electric current to be applied on said one or more windings, wherein said one or more windings operate to generate a magnetic field that interacts with a magnetic field generated by the one or more magnets to produce an output torque, when the electric current is applied on said one or more windings.

8. The gimbal system of claim 3, wherein:
a first set of windings are arranged on said stator;
a second set of windings are arranged on said rotor; and
one or more control modules that control electric currents to be applied on the first set of windings and the second set of windings, wherein the first set of windings operate to generate a magnetic field that interacts with a magnetic field generated by the second set of windings to produce an output torque, when the electric currents are applied.

9. The gimbal system of claim 3, wherein:
the stator operates to cause said rotor to perform a rotating movement about a center axis of said motor.

10. The gimbal system of claim 9, further comprising:
one or more bearings or sliding rings that allow for the rotating movement by said rotor relative to said stator, wherein said one or more bearings or sliding rings are configured to prevent the functional module from moving in a direction along the center axis.

11. The gimbal system of claim 1, wherein a center axis of the internal rotor motor matches a roll axis in the gimbal system.

12. The gimbal system of claim 1, wherein:
the internal rotor motor is configured to have a center of gravity that is at, or substantially close, to an intersection point of a roll axis, a pitch axis or a yaw axis in the gimbal system.

13. The gimbal system of claim 1, wherein:
the functional module includes an imaging module, which includes a lens and an imaging sensor.

14. The gimbal system of claim 13, further comprising:
an imaging control module that is electronically coupled with the imaging module, and wherein the imaging module uses a signal line to transmit recorded image signals to an imaging signal processor.

15. The gimbal system of claim 1, wherein:
the functional module includes a frame assembly that supports one or more devices, which are configured to perform one or more functions.

16. The gimbal system of claim 15, wherein:
the frame assembly is configured to operate to stabilize a payload.

17. The method of claim 2, wherein:
the internal rotor motor comprises a rotor and a stator, said rotor being arranged internally to said stator, and said rotor, which is rotatable relative to said stator, is configured to receive at least a portion of the functional module.

18. The method of claim 17, wherein:
said rotor includes a magnet yoke, and wherein the functional module is mounted within the magnet yoke in said rotor.

19. The method of claim 18, further comprising:
arranging one or more magnets on an outside surface of the magnet yoke in said rotor; and
arranging one or more windings on said stator.

20. The method of claim 19, further comprising:
using a control module to control electric current to be applied on said one or more windings, wherein said one or more windings operate to generate a magnetic field that interacts with a magnetic field generated by the one or more magnets to produce an output torque, when the electric current is applied on said one or more windings.

21. The method of claim 17, further comprising:
arranging one or more magnets on an inner surface of said stator;
arranging one or more windings on an outside surface of said rotor; and
using a control module to control electric current to be applied on said one or more windings, wherein said one or more windings operate to generate a magnetic field that interacts with a magnetic field generated by the one or more magnets to produce an output torque, when the electric current is applied on said one or more windings.

22. The method of claim 17, further comprising:
arranging a first set of windings on said stator;
arranging a second set of windings on said rotor; and
using a control module to control electric currents to be applied on the first set of windings and the second set of windings, wherein the first set of windings operate to generate a magnetic field that interacts with a magnetic field generated by the second set of windings to produce an output torque, when the electric currents are applied.

23. The method of claim 17, wherein:
the stator operates to cause said rotor to perform a rotating movement about a center axis of said motor.

24. The method of claim 23, further comprising:
providing one or more bearings or sliding rings that allow for the rotating movement by said rotor relative to said stator, wherein said one or more bearings or sliding rings are configured to prevent the functional module from moving a direction along the center axis.

25. The method of claim 2, wherein:
a center axis of the internal rotor motor matches a roll axis in the gimbal system.

26. The method of claim 2, further comprising:
configuring the internal rotor motor to have a center of gravity that is substantially close to an intersection point of a roll axis, a pitch axis or a yaw axis in the gimbal system.

27. The method of claim 2, wherein:
the functional module includes an imaging module, which includes a lens and an imaging sensor.

28. The method of claim 27, further comprising:
electronically coupling an imaging control module with the imaging module, wherein the imaging module uses a signal line to transmit recorded image signals to an imaging signal processor.

29. The method of claim 2, wherein:
the functional module includes a frame assembly that supports one or more devices, which are configured to perform one or more functions.

30. The method of claim 29, wherein:
the frame assembly is configured to operate to stabilize a payload.

* * * * *